Oct. 7, 1941.                    E. H. PIRON                    2,258,420
                          SELF-LUBRICATING BEARING
                             Filed July 22, 1938

EMIL H. PIRON
INVENTOR.
BY
ATTORNEY.

Patented Oct. 7, 1941

2,258,420

UNITED STATES PATENT OFFICE 2,258,420

SELF-LUBRICATING BEARING

Emil H. Piron, New York, N. Y., assignor to Transit Research Corporation, a corporation of New York Application July 22, 1938, Serial No. 220,645

6 Claims. (Cl. 308—238)

This invention relates to bearings and has for its object to provide a rotative support for oscillating movement together with a cushioning effect to damp vibration between the supporting and the supported part which cause noise.

Another object of the invention is to provide a resilient bearing of such shape as will accommodate itself to a tubular shaft subject to commercial variations in diameter without the necessity of machining.

In machinery and particularly in vehicles, metallic bearings often function under difficulty where they support levers or shafts which do not make a complete rotation because of the difficulty of maintaining a distribution of lubricant thereover. The shocks caused by vibration of the supported and supporting parts destroy the usual metallic surface. It is the main object of this invention to provide a resilient bearing, preferably made of a self-lubricating rubber or equivalent material, capable of allowing relative rotation of the supported or supporting parts with respect thereto and so shaped as to effectively fill the space allotted thereto, thereby reducing rattling to a minimum.

Another object is to provide a bearing which, by its shape, will exclude extraneous matter from its frictional surfaces and retain lubricant for said surfaces.

Figure 1:
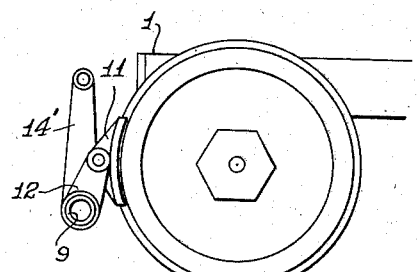
Figure 2:
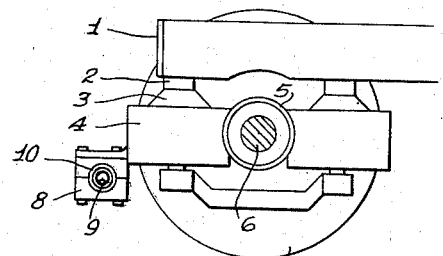
Figure 3:
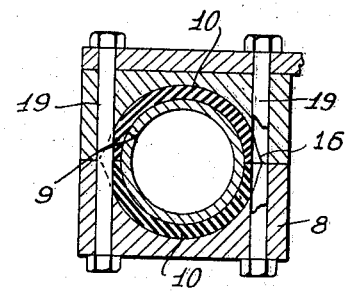
Figure 5:
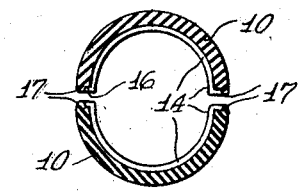
Figure 4:
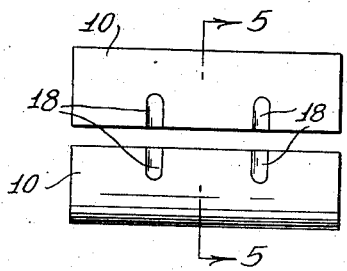
Figure 6:
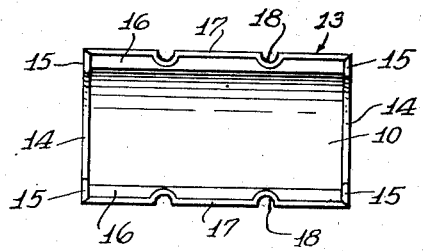
Figure 8:
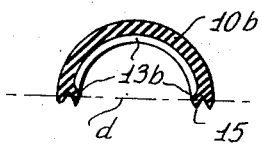
Figure 7:
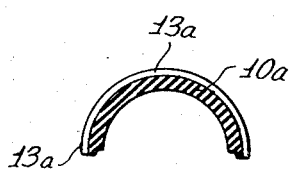

Other objects and advantages will become more fully apparent as reference is had to the accompanying drawing wherein my invention is illustrated, and in which, Fig. 1 is a side view of an end section of a rail truck and brake rigging with my invention applied thereto, Fig. 2 is a view similar to Fig. 1 taken from the inside of the truck, Fig. 3 is an enlarged detail diametric section of that part of the truck employing my invention, Fig. 4 is a side elevation of the elastic bearing, Fig. 5 is a diametric section along the line 5—5 of Fig. 4, Fig. 6 is a plan view of a bearing half of Fig. 5, viewed internally, Fig. 7 is a view similar to Fig. 5, showing a modified half bearing, and Fig. 8 is a view similar to Fig. 7 showing another modified form.

More particularly I indicates the frame of a rail truck having vertical shafts 2 depending therefrom and extending axially through cylindrical rubber journal springs 3 contained in spring retainers 4 integral with a journal bearing housing 5. An axle 6 for wheels 7 extends through the journal bearings. Integral with or fixedly secured to opposite end spring retainers 4 are the clamping brackets 8, one of which is shown in Fig. 2. The journal bearing assembly for the wheel (not shown) axially aligned with the wheel 7 is the same as illustrated, and hence a second bracket identical with the bracket 8 is found at the other side of the truck. Between the parts of those brackets 8 a brake supporting shaft 9 is rotatably mounted. The bearing 10 which separates the bracket halves and the shaft 9 is made of an elastic plastic material such as rubber, and constructed according to my invention.

The shaft 9 extends outwardly through the brackets 8 for the support of brake shoes 11 which are pivotally mounted upon the brake arms 12, these arms 12 being, in turn, rigidly mounted on the shaft 9 for rotation therewith. The shaft 9 and the brake arms 12 are actuated by a lever arm 14' which may be connected to a manual or power actuating means, not shown.

The bearing 10 is preferably made of an elastic plastic such as rubber which has been impregnated with paraffin wax, castor oil or other material of similar type which will convert it into a self-lubricating bearing. The brake supporting shaft 9 and its environment was chosen as an example of an installation where it is highly desirable to employ a shaft purchased in the form of commercial tubing and hence variable from length to length in diameter by a substantial amount, say, one thirty-second of an inch and which is to be rotatably secured in a machined bearing bracket. Numerous other adaptations might have been chosen in order for the bearing 10 to fill the space between the bracket 8 and the shaft 9 without rattling because of looseness on the one hand, and without overstressing the rubber on the other hand, the bearing is provided with beading 13 at all external edges both circumferentially and longitudinally, as viewed in bottom plan view. In other words, the beading follows the contour of the cylindrical portions or bearing surfaces internally thereof and at each end thereof as indicated by the numeral 14. It then continues at 15 radially outwardly, following the outer edges of the flat portions 16 whereupon longitudinal portions 17 connect the portions 15 of opposite ends. The outside contour of the beading when viewed in bottom (internal) plan may be said to be the same as the outside contour of the beading. Thus, if an undersized shaft is to be accommodated, the beading 13 will deform very little. In the case of a shaft of maximum oversize the beading will deform a maximum amount, that is, it will assume substantially the same shape as the interior of the bearing. In either case the beading will serve to exclude foreign matter from finding its way between the bearing and its shaft and, particularly where the shaft is not of maximum oversize diameter, it will retain lubricant between the bearing and its shaft.

It will be understood from the foregoing that the shaft is expected to rotate with respect to the bearing. However, if the beading is on the exterior surface of the bearing, as indicated at 13a in Fig. 7, the bearing will probably rotate with its shaft and with respect to the bearing bracket. Where the bearing is made of rubber which is not of the self lubricating type relative rotation of the bracket and shaft will impose torsional stresses in the bearing.

In Fig. 8 the bearing 10b is provided with a beading 13b and with a V-shaped cutout at 15 in order to provide room for radially outward flow of rubber when the bearing 10b is in bead-deforming assembly. Preferably, the tips of the V extend across the diameter $d$ so that each half bearing is greater than 180° in circumference.

In Fig. 3 the bearing bracket members 8 are cut back or chamfered at their juncture 16 to provide room for the longitudinal rubber bead to flow when clamped about a tube of less than the largest diameter intended.

Where it is desired to employ means restraining rotation of the bearing, grooves 18 are provided to receive the bolts 19 which clamp the bracket halves together.

What is claimed is:

1. A sleeve for insertion between a relatively movable bracket and a shaft, said sleeve being composed of an elastic plastic and having an integral circumferential flange at each end thereof, said flange having a diameter different from that of the sleeve proper and more readily deformable than the sleeve proper and constituting deformable means adapted to be compressed when the sleeve is inserted between a shaft and bearing bracket to avoid excessive distortion of the sleeve proper and to exclude foreign matter.

2. A bearing for insertion between a relatively movable bracket and a shaft, said bearing being composed of an elastic plastic and having an internal circumferential beading at each end thereof and more readily deformable than the main portion of the bearing, said beading constituting deformable means adapted to be compressed when the bearing is inserted between a bracket and a shaft to avoid excessive distortion of the bearing proper and to effect a seal for excluding foreign matter.

3. A bearing for insertion between a relatively movable bracket and a shaft, said bearing being composed of an elastic plastic impregnated with a lubricant and having an internal circumferential beading at each end thereof and more readily deformable than the main portion of the bearing, said beading constituting deformable means adapted to be compressed when the bearing is inserted between a bracket and a shaft to avoid excessive distortion of the bearing proper and to effect a seal for excluding foreign matter.

4. A bearing for insertion between a relatively rotatable bracket and a shaft, said bearing being composed of mating half cylinders of elastic material, each of said half cylinders having an integral internal circumferential beading at each end thereof more readily deformable than the half cylinders proper, said beading constituting deformable means adapted to be compressed when said half cylinders are inserted between a bracket and a shaft to avoid excessive distortion of the bearing proper and to effect a seal for excluding foreign matter.

5. A bearing for insertion between a relatively rotatable bracket and shaft, said bearing being composed of mating half cylinders of elastic material, each of said half cylinders having beading arising from the outer edges thereof as viewed in an internal plan view, said beading being more readily deformable than the half sections proper and being adapted to be compressed when the half sections are inserted between a bracket and a shaft.

6. A bearing for insertion between a relatively rotatable bracket and shaft, said bearing being composed of mating half cylinders of elastic material, each of said half cylinders having beading arising from the outer edges thereof as viewed in an internal plan view, and a bolt accommodating groove in said half cylinders encircled by a portion of said beading, said beading being more readily deformable than the half sections proper and being adapted to be compressed when the half sections are inserted between a bracket and a shaft.

EMIL H. PIRON.